United States Patent
Zhang et al.

(10) Patent No.: US 12,448,316 B2
(45) Date of Patent: Oct. 21, 2025

(54) FABRICATION METHOD AND USE OF F40 mm LARGE-SIZE AND HIGH-CONTRAST

(71) Applicant: CHINA BUILDING MATERIALS ACADEMY CO., LTD., Beijing (CN)

(72) Inventors: Lei Zhang, Beijing (CN); Jinsheng Jia, Beijing (CN); Yue Zhao, Beijing (CN); Yu Shi, Beijing (CN); Huichao Xu, Beijing (CN); Haoyang Yu, Beijing (CN); Jing Zhang, Beijing (CN); Zhiheng Fan, Beijing (CN); Xian Zhang, Beijing (CN); Xiaofeng Tang, Beijing (CN); Puguang Song, Beijing (CN); Jiuwang Wang, Beijing (CN); Yun Wang, Beijing (CN); Yang Fu, Beijing (CN); Yajie Du, Beijing (CN); Yonggang Huang, Beijing (CN)

(73) Assignee: CHINA BUILDING MATERIALS ACADEMY CO., LTD., Beijing (CN)

( * ) Notice: Subject to any disclaimer, the term of this patent is extended or adjusted under 35 U.S.C. 154(b) by 209 days.

(21) Appl. No.: 18/356,173

(22) Filed: Jul. 20, 2023

(65) Prior Publication Data
US 2024/0092679 A1 Mar. 21, 2024

Related U.S. Application Data

(63) Continuation of application No. PCT/CN2023/071265, filed on Jan. 9, 2023.

(51) Int. Cl.
*C03C 21/00* (2006.01)
*C03B 35/00* (2006.01)
(Continued)

(52) U.S. Cl.
CPC .. *C03B 37/01214* (2013.01); *C03B 37/01268* (2013.01); *C03B 37/15* (2013.01);
(Continued)

(58) Field of Classification Search
CPC .................................................. C03B 37/01211
See application file for complete search history.

(56) References Cited

U.S. PATENT DOCUMENTS 4,175,940 A * 11/1979 Siegmund ............. C03B 37/028
65/408
7,305,164 B2 * 12/2007 Williams .......... C03B 37/01205
385/127
(Continued)

FOREIGN PATENT DOCUMENTS

CN  106517772 A  *  3/2017
CN  110183108 A  *  8/2019  ............. C03B 17/04
(Continued)

*Primary Examiner* — Erin Snelting
*Assistant Examiner* — Steven S Lee

(57) ABSTRACT

The present invention discloses a fabrication method and use of a Φ40 mm sized fiber optic image inverter, belonging to the field of manufacturing of fiber optic imaging elements. The light-absorbing glass for preparing the Φ40 mm sized fiber optic image inverter consists of the following components in molar percentage: $SiO_2$ 60-69.9, $Al_2O_3$ 1.0-10.0, $B_2O_3$ 10.1-15.0, $Na_2O$ 1.0-8.0, $K_2O$ 3.0-10.0, $MgO$ 0.1-1.0, $CaO$ 0.5-5.0, $ZnO$ 0-0.1, $TiO_2$ 0-0.1, $ZrO_2$ 0.1-1.0, $Fe_2O_3$ 3.0-6.5, $Co_2O_3$ 0.1-0.5, $V_2O_5$ 0.51-1.5 and $MoO_3$ 0.1-1.0. The Φ40 mm sized fiber optic image inverter has the advantages of low crosstalk of stray light, high resolution and high contrast.

10 Claims, 2 Drawing Sheets

(51) Int. Cl.
*C03B 37/012* (2006.01)
*C03B 37/15* (2006.01)
*C03B 37/16* (2006.01)

(52) U.S. Cl.
CPC .......... *C03B 37/16* (2013.01); *C03B 2203/04* (2013.01); *C03B 2203/40* (2013.01)

(56) References Cited

U.S. PATENT DOCUMENTS

| | | | | |
|---|---|---|---|---|
| 8,755,658 B2* | 6/2014 | Proulx | ............... | G02B 6/02347 385/125 |
| 2011/0280532 A1* | 11/2011 | Sasaoka | ............ | C03B 37/01222 65/409 |
| 2017/0205576 A1* | 7/2017 | Tabor | .................... | G02B 6/449 |

FOREIGN PATENT DOCUMENTS

| | | | | | |
|---|---|---|---|---|---|
| CN | 111393023 A | * | 7/2020 | ............. | C03B 19/02 |
| CN | 111694090 A | * | 9/2020 | ............... | G02B 6/02 |
| CN | 113603366 A | * | 11/2021 | ....... | C03B 37/01214 |
| CN | 113979631 A | * | 1/2022 | ....... | C03B 37/01211 |
| WO | WO-2008098338 A1 | * | 8/2008 | ....... | C03B 37/01225 |

* cited by examiner

FABRICATION METHOD AND USE OF F40 mm LARGE-SIZE AND HIGH-CONTRAST

CROSS-REFERENCE TO RELATED APPLICATIONS

This patent application claims the benefit and priority of Chinese Patent Application No. 202211101456.8 filed on Sep. 9, 2022, the disclosure of which is incorporated by reference herein in its entirety as part of the present application.

TECHNICAL FIELD

The present invention relates to the field of manufacturing of fiber optic imaging elements, and in particular to a fabrication method and use of a Φ40 mm sized fiber optic image inverter.

BACKGROUND OF THE INVENTION

Fiber optic imaging elements include fiber optic faceplates, fiber optic image inverters, fiber optic tapers, fiber optic bundles for light transmission, etc., and are photoelectric imaging components with excellent performances. Most typically, the fiber optic imaging elements are applied as the optical input and output windows for low-level-light image intensifiers, playing an important role in improving the quality of imaging devices. The image transmission mechanism of the fiber optic imaging elements is realized under the principle of the total reflection of optical fibers. The optical fibers in the fiber optic imaging elements are fabricated by cladding glass tubes with a low refractive index, core glass rods with a high refractive index and light-absorbing glass fibers with a high absorption efficiency of stray light, and are fabricated by a drawing process of vacuum control and rod-tube combination via heat press fusion. Since the optical fibers are totally fused together with the cladding glass, the adjacent optical fibers are arranged close to one another, resulting in optical crosstalk among the adjacent fibers. Alternatively, the problems such as uneven wall thickness of the cladding glass tubes may be caused by uneven temperature field or drawing force during fabrication, and these may eventually result in the phenomenon of light permeation where the input light penetrates the cladding glass during total reflection, leading to light leakage. Alternatively, due to the presence of defects or pollutants in the core glass or the cladding glass contact interfaces of the optical fibers, the condition for total reflection of light is destroyed, so that the light scatters at these places, and the scattered light enters into the adjacent fibers to result in optical crosstalk. The presence of stray light is an important factor that directly affects the imaging quality of the fiber optic imaging elements such as contrast. In order to solve the problems above, the gaps among the adjacent optical fibers are usually filled with the light-absorbing glass fibers, which are used to absorb the stray light so as to improve the imaging quality of the fiber optic imaging elements. The light-absorbing glass fibers are inserted into the gaps of the arranged optical fibers for the absorption of such as optical crosstalk and light leakage. However, a complete optical insulation cannot be achieved, a key reason for which is the material of the light-absorbing glass. The ordinary light-absorbing glass still has a relatively high transmittance within the visible light range at a thickness of 0.5 mm, and with the reduction of thickness, the transmittance increases gradually. For the conventional light-absorbing glass in the fiber optic imaging elements, the problems such as a low absorption efficiency of stray light and poor imaging contrast appear commonly. Especially for the optical fibers with a fiber diameter of no more than 4 m used in the fiber optic imaging elements, the coloring ions in the light-absorbing glass may diffuse into the cladding glass, failing to meet the application requirements for the fiber optic imaging elements with high contrast. Low-level-light vision technology plays a very important role in observation at night. The low-level-light vision device, which is widely used in the field of night vision, has the abilities to observe and aim under low-level-light conditions at night with the characteristics of high resolution and good stereoscopic vision, and is a main equipment for soldiers to fight at night, ensuring the soldiers to complete the tasks of detecting, aiming and hitting combat objectives at night. The capability of the low-level-light vision devices to capture sufficiently clear detail information has a lot to do with the contrast of the fiber optic imaging elements. The contrast is an important performance index in the fiber optic imaging transmission products. With the development of fiber optic imaging transmission technology, the requirements for various performances of products increase continuously, and fiber optic image inverters are the key material to ensure the imaging quality of the low-level-light vision devices. The fiber optic image inverter with an useful area of more than Φ40 mm is called a large-size fiber optic image inverter. The large-size fiber optic image inverter has the characteristics of such as a large volume, a high resolution and a large visual field with stable image transmission, and is widely used in machine vision, flight simulator and aiming of other aspects, which can thus be used for, for example, gun aiming of main battle tanks, reconnaissance and surveillance on periscopes, timely acquisition of nuclear experiment images and low-level-light vision systems in large armored vehicles, tanks and large ships. The large-size fiber optic image inverter is a rigid fiber optic imaging component that is prepared by thousands of optical fibers with a fiber pitch of less than 6 m via tightly stacking and arranging, heat press fusing and twisting operation and can transmit images. Each optical fiber in the large-size fiber optic image inverter has a good optical insulation, and thus can transmit light and images independently without being affected by other optical fibers nearby. As an optical coupling imaging transmission device, the large-size fiber optic image inverter has the characteristics of such as high resolution, zero distortion and high efficiency of light transmission and meanwhile has the function of image inverting, and thus can realize observation with a large size, a large visual field and a long distance.

At present, the fiber optic image inverters that can be batch produced in China have mostly a size of diameter Φ30 mm or less. Since the large-size fiber optic image inverter is mainly used in cathode ray tubes, camera tubes, image intensifiers and other instruments and equipment that need to transmit images, the requirements for the fabrication process of product are extremely high. The large-size fiber optic image inverter has a large diameter and a large volume. Thus, in the fabrication process, the larger the volume of a fiber optic faceplate block is, the more difficult the heating and penetrating process of the fiber optic faceplate block becomes, and the time for heating gets longer and the twisting operation process is more difficult correspondingly. Nevertheless, the longer the time for heating is, the greater the probability of the coloring ions in the light-absorbing glass penetrating into the cladding glass tube becomes, and the greater the probability of the fiber structure in the fiber optic image inverter being stretched and destroyed during the high-temperature process becomes, which will lead to the defects such as multifiber shading, chicken wire, spots and resolution loss at the edges in the fiber optic image inverter. Especially with the increase in the shape size of the fiber optic image inverters, enormous difficulties will be brought to the fabrication process. In the fabrication process, not only the requirements for transmittance at the edges, but also the influences of temperature, viscosity matching of the three materials in process and mutual diffusion of components on the resolution at the edges, image distortion and internal spot defects of the fiber optic image inverter during fabricating should be considered. Therefore, the fabrication of high-contrast fiber optic image inverters with a large size is very difficult.

SUMMARY OF THE INVENTION

In order to solve the technical problems in the prior art, the present invention provides a method for preparing a Φ40 mm sized fiber optic image inverter with an useful area of more than Φ40 mm.

To achieve the object above, the technical solution of the present invention is as follows:

The present invention provides a method for preparing a Φ40 mm sized fiber optic image inverter, comprising the following steps:

(1) mono fibers and light-absorbing glass fibers preparing: matching core glass rods with a high refractive index and cladding glass tubes with a low refractive index, followed by drawing to obtain mono fibers, wherein each of the mono fibers has a diameter of 3.20-4.20 mm; drawing light-absorbing glass into light-absorbing glass fibers, wherein each of the light-absorbing glass fibers has a diameter of 0.49-0.64 mm;

(2) multi fiber assemblies drawing: arranging the mono fibers to form a mono fiber hexagonal prism with a hexagonal cross section, and inserting the light-absorbing glass fibers into gaps among the mono fibers drawn to obtain multi fiber assemblies, wherein in the mono fiber hexagonal prism, there are 4 mono fibers at each side of the hexagonal cross section of the mono fiber hexagonal prism with the total number of the mono fibers to be 37, and the number of the light-absorbing glass fibers inserted is 24-60; then drawing the multi fiber assemblies into multi fibers, wherein each of the multi fibers has a hexagonal cross section corresponding to that of the multi fiber assembly, and a distance between opposite sides of the hexagonal cross section of the multi fiber is 0.78-0.98 mm;

(3) multi-multi assemblies drawing: arranging the multi fibers to form a multi fiber hexagonal prism with a hexagonal cross section to obtain multi-multi assemblies, wherein in the multi-multi assemblies arranged by the multi fibers, there are 17 multi fibers at each side of the hexagonal cross section of the multi fiber hexagonal prism with the total number of the multi fibers to be 817; then drawing the multi-multi assemblies into multi-multi fibers, wherein each of the multi-multi fibers has a hexagonal cross section corresponding to that of the multi-multi assembly, and a distance between opposite sides of the hexagonal cross section of the multi-multi fiber is 0.87-0.89 mm; and (4) heat press fusing and twisting: cutting the multi-multi fibers into a fixed length and arranging into a fiber assembly bundle, followed by subjecting to heat press fusion according to a designed compression ratio before and after heat press fusion of the fiber assembly bundle to obtain a fiber optic faceplate block of the Φ40 mm sized fiber optic image inverter with a fiber pitch of no more than 4.0 m; then subjecting both ends of the fiber optic faceplate block to a twisting operation at an angle of 180° to obtain the Φ40 mm sized-fiber optic image inverter with an effective area of more than $40 mm.

A method for preparing the light-absorbing glass comprises the following steps:

(1) raw material formulating: weighing quartz sand, aluminum oxide, boric acid or boric anhydride, sodium carbonate, potassium carbonate, basic magnesium carbonate, calcium carbonate, zinc oxide, titanium dioxide, zirconium oxide, ferric oxide, cobalt trioxide, vanadium pentoxide and molybdenum oxide in proportion and mixing evenly to obtain a raw material mixture;

(2) glass melting: putting the raw material mixture in a crucible for high-temperature melting, fining after the raw material mixture is molten, casting the obtained molten glass after melting and fining into a specified specification in a mold, and annealing after the glass is cooled and solidified to obtain the light-absorbing glass.

The melting comprises melting at a temperature within a range of 1450-1550° C. for 3-5 hours, and stirring the raw material mixture for 1-2 times during the melting process.

The fining is conducted at a temperature within a range of 1300-1400° C. for 1-2 hours.

The annealing is conducted by preserving at a temperature within a range of 500-549° C. for 2-3 hours, and then cooling to room temperature within 20-24 hours.

The method further includes: after the molten glass is cast and before totally solidified, using a vibrator to vibrate the molten glass evenly to remove internal holes and bubbles in the molten glass.

A method for preparing the core glass rod comprises the following steps:

(1) putting raw materials of quartz sand, boric acid or boric anhydride, calcium carbonate, strontium carbonate, barium nitrate, titanium dioxide, lanthanum oxide, gadolinium oxide and niobium oxidein a platinum crucible according to formulating requirements;

(2) melting at a first temperature, stirring for 2-3 times during the melting process, and then cooling to a second temperature for fining;

(3) casting the obtained molten glass after fining into a specified glass product; and (4) annealing the glass product molded in an annealing furnace, followed by furnace cooling to room temperature.

The first temperature is within a range of 1450-1550° C., the second temperature is within a range of 1380-1420° C., and the melting is conducted for 5-10 hours; the fining is conducted for 1.5-2.5 hours; the annealing is conducted by preserving at a temperature within a range of 590-610° C. for 1.5-2.5 hours, and then cooling to 100° C. within 20-24 hours.

The light-absorbing glass consists of the following components in molar percentage:

| | |
|---|---|
| $SiO_2$ | 60.0-69.9% |
| $Al_2O_3$ | 1.0-10.0% |
| $B_2O_3$ | 10.1-15.0% |
| $Na_2O$ | 1.0-8.0% |
| $K_2O$ | 3.0-10.0% |
| MgO | 0.1-1.0% |

-continued

| | |
|---|---|
| CaO | 0.5-5.0% |
| ZnO | 0-0.1% |
| TiO$_2$ | 0-0.1% |
| ZrO$_2$ | 0.1-1.0% |
| Fe$_2$O$_3$ | 3.0-6.5% |
| Co$_2$O$_3$ | 0.1-0.5% |
| V$_2$O$_5$ | 0.51-1.5% |
| MoO$_3$ | 0.1-1.0%. |

Preferably, the light-absorbing glass consists of the following components in molar percentage:

| | |
|---|---|
| SiO$_2$ | 60.0-65.0% |
| Al$_2$O$_3$ | 3.0-6.0% |
| B$_2$O$_3$ | 11.0-15.0% |
| Na$_2$O | 5.0-8.0% |
| K$_2$O | 3.0-8.0% |
| MgO | 0.1-1.0% |
| CaO | 1.0-2.5% |
| ZnO | 0-0.1% |
| TiO$_2$ | 0-0.1% |
| ZrO$_2$ | 0.1-1% |
| Fe$_2$O$_3$ | 5.0-6.5% |
| Co$_2$O$_3$ | 0.1-0.5% |
| V$_2$O$_5$ | 0.51-1.0% |
| MoO$_3$ | 0.1-1.0%. |

The light-absorbing glass has a strong and uniform light absorption ability and light spectrum absorption effect within a wavelength range of 400-700 nm at a thickness of 0.3±0.01 mm, with a light spectrum transmittance of no more than 0.1%.

A core glass used for the core glass rod has a the refractive index of 1.79-1.82, and consists of the following components in molar percentage: SiO$_2$ 20-25%, B$_2$O$_3$ 19-27%, CaO 0.5-5%, SrO 1-5%, BaO 15-25%, TiO$_2$ 10-15%, La$_2$O$_3$ 5-15%, Gd$_2$O$_3$ 7.1-10% and Nb$_2$O$_5$ 1-5%.

Preferably, the core glass consists of the following components in molar percentage:

| | |
|---|---|
| SiO$_2$ | 20.0-24.0% |
| B$_2$O$_3$ | 20.0-27.0% |
| CaO | 0.5-2.5% |
| SrO | 2.5-4.0% |
| BaO | 16.0-21.0% |
| TiO$_2$ | 10.0-13.0% |
| La$_2$O$_3$ | 5.0-8.0% |
| Gd$_2$O$_3$ | 7.1-8.5% |
| Nb$_2$O$_5$ | 1.0-3.5%. |

The core glass has a mean linear thermal expansion coefficient of $(89\pm4)\times10^7/°$ C. within a range of 30-300° C.

The present invention further provides a Φ40 mm sized fiber optic image inverter, prepared by the method described above.

The Φ40 mm sized fiber optic image inverter has an optical crosstalk of less than 1.0% at 0.1 mm from a cutting edge; the Φ40 mm sized fiber optic image inverter has a resolution of more than 140 lp/mm; the Φ40 mm sized fiber optic image inverter has a light spectrum transmittance of more than 70% within a wavelength range of 400-700 nm.

The present invention further provides a use of the Φ40 mm sized fiber optic image inverter described above in a low-level-light image intensifier.

The light-absorbing glass in the present invention can be applied to a high-contrast fiber optic image inverter, and the high-contrast fiber optic image inverter can be applied to a low-level-light image intensifier.

The light-absorbing glass in the present invention has a good light absorption performance, which is suitable for glass fibers being used as a glass material for extra-mural absorption in the fabrication of fiber optic imaging elements, and is especially suitable for preparing high-contrast fiber optic image inverters. The fiber optic imaging elements include fiber optic faceplates, fiber optic image inverters, fiber optic tapers, fiber optic bundles for image transmission, etc.

In the present invention, SiO$_2$ is a main body to form the structure network of glass and is a component that plays a major role in the glass structure network. In the core glass, the molar percentage (mol. %) of SiO$_2$ is 20.0-25.0. When the content of SiO$_2$ in the core glass is lower than 20.0 mol. %, it is difficult for the glass to obtain a high refractive index, and meanwhile the chemical resistance of the glass will be reduced; when the content of SiO$_2$ in the core glass is higher than 25.0 mol. %, the high-temperature viscosity of the glass will be increased, resulting in an excessively high temperature for glass melting, and meanwhile the thermal expansion coefficient of the glass will be reduced.

In the light-absorbing glass, the molar percentage (mol. %) of SiO$_2$ is 60-69.9. When the content of SiO$_2$ in the light-absorbing glass is lower than 60 mol. %, it is difficult to obtain a thermal expansion coefficient similar to the cladding glass, and meanwhile the chemical resistance of the glass will be reduced; when the content of SiO$_2$ in the light-absorbing glass is higher than 69.9 mol. %, the high-temperature viscosity of the glass will be increased, resulting in an excessively high temperature for glass melting.

B$_2$O$_3$ is a glass-forming oxide and a component of the glass structure network, and meanwhile is a fluxing agent to reduce the viscosity of glass melting. Boron-oxygen triangle [BO$_3$] and boron-oxygen tetrahedron [BO$_4$] are the structural elements. Boron may exist as triangle [BO$_3$] or boron-oxygen tetrahedron [BO$_4$] under different conditions. At the condition of high-temperature melting, it is usually difficult for boron to form boron-oxygen tetrahedron but can only exist in the form of trihedral, while at low temperatures, B$^{3+}$ has the tendency to capture free oxygen to form tetrahedron under certain conditions, which makes the structure compact and thus improves the low-temperature viscosity of glass. Nevertheless, B$_2$O$_3$ has the characteristics of reducing glass viscosity at high temperatures and increasing glass viscosity at low temperatures, and it is also a main component to reduce the refractive index of the glass, both of which determine that the content range of B$_2$O$_3$ is relatively small. In the core glass, the molar percentage (mol. %) of B$_2$O$_3$ is 19.0-27.0. When the content of B$_2$O$_3$ is lower than 19.0 mol. %, it cannot play a role in fluxing, and meanwhile the chemical resistance of the glass will be reduced; when the content of B$_2$O$_3$ is higher than 27.0 mol. %, the refractive index of the glass will be reduced and the phase separation tendency of the glass will be increased. In the light-absorbing glass, the molar percentage (mol. %) of B$_2$O$_3$ is 10.1-15.0. When the content of B$_2$O$_3$ is higher than 15.0 mol. %, the refractive index of the glass will be reduced and the phase separation tendency of the glass will be increased.

CaO is a network modifier oxide of the glass structure. In the core glass, the molar percentage (mol. %) of CaO is 0.5-5.0. When the content of CaO is higher than 5.0 mol. %, the chemical resistance of the glass will be reduced and the thermal expansion coefficient of the glass will be increased. In the light-absorbing glass, when the content of CaO is higher than 5.0 mol. %, the chemical resistance of the glass will be reduced, the refractive index of the glass will be increased, and the crystallization tendency of the glass will be increased. Therefore, the molar percentage (mol. %) of CaO in the light-absorbing glass is 0.5-5.0.

In the core glass, $TiO_2$ is used to increase the refractive index and transmittance of the glass. The molar percentage (mol. %) of $TiO_2$ is 10.0-15.0. When the content of $TiO_2$ is higher than 15 mol. %, the transmittance of the glass will be reduced. In the light-absorbing glass, $TiO_2$ is used to adjust the chemical resistance and crystallization of the glass. The molar percentage (mol. %) of $TiO_2$ is 0-0.1. When the content of $TiO_2$ is higher than 0.1 mol. %, the chemical resistance of the glass will be reduced and the tendency of crystallization will be increased.

SrO is an alkaline earth metal oxide and a network modifier oxide of the glass structure. In the core glass, the molar percentage (mol. %) of SrO is 1.0-5.0. When the content of SrO is higher than 5.0 mol. %, the chemical resistance of the glass will be reduced and the thermal expansion coefficient of the glass will be increased. In the cladding glass, the molar percentage of SrO is 0.1-5.0 mol. %. When the content of SrO is higher than 5.0 mol. %, the chemical resistance of the glass will be reduced and the crystallization tendency of the glass will be increased.

BaO is a network modifier oxide of the glass structure and can effectively increase the refractive index of the glass. In the core glass, the molar percentage (mol. %) of BaO is 15.0-25.0. When the content of BaO is higher than 25.0 mol. %, the crystallization temperature of the glass will be increased, the crystallization tendency of the glass will be increased, and meanwhile the density of the glass will be significantly increased.

$La_2O_3$ is a lanthanide rare earth oxide and can increase the refractive index of the glass. In the core glass, the molar percentage (mol. %) of $La_2O_3$ is 5.0-15.0. When the content of $La_2O_3$ is higher than 15.0 mol. %, the thermal expansion coefficient of the glass will be increased.

$Gd_2O_3$ is also a rare earth oxide and can increase the refractive index of the glass. The molar percentage (mol. %) of $Gd_2O_3$ is 7.1-10.0. When the content of $Gd_2O_3$ is higher than 10.0 mol. %, the density and thermal expansion coefficient of the glass will be increased.

$Nb_2O_5$ is also a rare earth oxide and can increase the refractive index of the glass. The molar percentage (mol. %) of $Nb_2O_5$ is 1.0-5.0. When the content of $Nb_2O_5$ is higher than 5.0 mol. %, the density and thermal expansion coefficient of the glass will be increased.

$Al_2O_3$ belongs to the intermediate oxides of the glass and meanwhile can reduce the phase separation tendency of the glass. $Al^{3+}$ has two coordination states in the glass, that is, in tetrahedron or octahedron. When oxygen is sufficient in the glass, aluminum-oxygen tetrahedron $[AlO_4]$ is formed, which forms a continuous network with silicon-oxygen tetrahedron. When oxygen is insufficient in the glass, aluminum-oxygen octahedron $[AlO_6]$ is formed, which acts as a network modifier and is in the holes of the silicon-oxygen structural network. Thus, within a certain content range, $Al_2O_3$ may serve as a main body to form the glass network like $SiO_2$. In the light-absorbing glass, when the content of $Al_2O_3$ is higher than 10.0 mol. %, the high-temperature viscosity of the glass will be significantly increased, leading to an increase in the temperature for glass melting. Therefore, the molar percentage (mol. %) of $Al_2O_3$ is 1.0-10.0.

$Na_2O$ is an alkali metal oxide and a network modifier oxide of the glass structure. In the light-absorbing glass, when the content of $Na_2O$ is higher than 8.0 mol. %, the thermal expansion coefficient of the glass will be increased and meanwhile the refractive index of the glass will be increased. Therefore, the molar percentage (mol. %) of $Na_2O$ is 1.0-8.0.

$K_2O$ is an alkali metal oxide and a network modifier oxide of the glass structure. In the light-absorbing glass, when the content of $K_2O$ is higher than 10.0 mol. %, the thermal expansion coefficient of the glass will be increased and meanwhile the refractive index of the glass will be increased. Therefore, the molar percentage (mol. %) of $K_2O$ is 3.0-10.0.

MgO is an alkaline earth metal oxide and a network modifier oxide of the glass structure. In the light-absorbing glass, when the content of MgO is higher than 1.0 mol. %, the crystallization tendency of the glass will be increased, and meanwhile the density of the glass will be reduced and the refractive index of the glass will be increased. Therefore, the molar percentage (mol. %) of MgO is 0.1-1.0.

In the light-absorbing glass, ZnO is used to adjust the crystallization temperature and chemical resistance of the glass. The molar percentage of ZnO is 0-0.1 mol. %. When the content of ZnO is higher than 0.1 mol. %, the chemical resistance of the glass will be reduced and the tendency of crystallization will be increased.

In the light-absorbing glass, $ZrO_2$ is used to adjust the chemical resistance and crystallization of the glass. The molar percentage (mol. %) of $ZrO_2$ is 0.1-1.0. When the content of $ZrO_2$ is higher than 1.0 mol. %, the chemical resistance of the glass will be reduced and the tendency of crystallization will be increased.

$Fe_2O_3$ is a light-absorbing coloring agent for the light-absorbing glass. The molar percentage (mol. %) of $Fe_2O_3$ is 3.0-6.5. In the present invention, $Fe_2O_3$ is a light-absorbing agent that plays a major role. $Fe^{3+}$ ions have a good light absorption performance, and the light absorption range is mainly concentrated within a region from visible light to infrared ray. When the content of $Fe_2O_3$ is higher than 6.5 mol. %, the chemical resistance of the glass will be reduced and the crystallization tendency of the glass will be increased. When the content of $Fe_2O_3$ is less than 3.0 mol. %, the coloring of $Fe_2O_3$ will become unstable or even fade during drawing of the fibers at high temperatures, which directly affects the light absorption effect, thereby making a serious impact on improving the image transmission quality of the fiber optic image inverters and failing to meet the application requirements for improving the contrast of the fiber optic image inverters.

$Co_2O_3$ is a coloring agent for the light-absorbing glass. The molar percentage (mol. %) of $Co_2O_3$ is 0.1-0.5. $Co_2O_3$ can bind to the iron ions to form a stable form in the glass, thereby making the coloring of the light-absorbing material more stable. When the content of $Co_2O_3$ is higher than 0.5 mol. %, the chemical resistance of the glass will be reduced, and the crystallization tendency of the glass will be increased.

$V_2O_5$ is a coloring agent for the light-absorbing glass. The molar percentage (mol. %) of $V_2O_5$ is 0.51-1.5. $V_2O_5$ can fix the coloring of the iron ions, thereby making the coloring of the light-absorbing material more stable. When the content of $V_2O_5$ is higher than 1.5 mol. %, the chemical resistance of the glass will be reduced, and the crystallization tendency of the glass will be increased.

$MoO_3$ is a transition metal oxide and also a coloring agent for the light-absorbing glass. The molar percentage (mol. %) of $MoO_3$ is 0.1-1.0. $MoO_3$ can bind to the iron ions and cobalt ions to form stable coloring in the glass. With the composite absorption, it can be ensured that the stray light within a wavelength range of 400-700 nm will be absorbed, achieving a desirable light absorption effect and avoiding the appearance of obvious transmittance peaks within the visible light region in a light absorption curve. Nevertheless, when the content of $MoO_3$ is higher than 1.0 mol. %, the chemical resistance of the glass will be reduced, and the crystallization tendency of the glass will be increased.

Compared with the prior art, the light-absorbing glass for the Φ40 mm sized fiber optic image inverter in the present invention has the following characteristics:

(1) The light-absorbing glass has a good light absorption performance. The light-absorbing glass has a strong and uniform light absorption ability and light spectrum absorption effect within a wavelength range of 400-700 nm at a thickness of 0.3±0.01 mm, with a light spectrum transmittance of no more than 0.1%. (2) The light-absorbing glass has a thermal expansion coefficient and viscosity properties similar to the cladding glass, and the thermal expansion coefficient of the glass is $(82\pm2)\times10^{-7}/°$ C.

(3) The light-absorbing glass has good performances on chemical stability and anti-crystallization. The light-absorbing glass has no stones or bubbles or holes inside after melting, and has no phase separation or crystallization after preserving at 820° C. for 6 hours, which has a good anti-crystallization performance and excellent chemical stability.

The core glass for the Φ40 mm sized fiber optic image inverter in the present invention has the following characteristics:

(1) The core glass has a suitable thermal expansion coefficient, and the mean linear thermal expansion coefficient is $(89\pm4)\times10^{-7}/°$ C. within a range of 30-300° C.

(2) The core glass has a high refractive index, and the refractive index $n_D$ is 1.79-1.82.

(3) The core glass has a good anti-crystallization performance, and the crystallization temperature is above 850° C.

(4) The core glass has a good transparency to visible light radiation and good chemical stability.

(5) The core glass contains no oxides of heavy metal elements which are harmful to the environment, such as $As_2O_3$, $Sb_2O_3$, PbO and CdO.

(6) The core glass has viscosity properties matching the cladding glass.

(7) The core glass has a suitable temperature for glass melting.

The Φ40 mm sized fiber optic image inverter prepared by the core glass and the light-absorbing glass described above has the following advantages:

(1) The Φ40 mm sized fiber optic image inverter has an optical crosstalk of less than 1.0% at 0.1 mm from a cutting edge.

(2) The Φ40 mm sized fiber optic image inverter has a resolution of more than 140 lp/mm.

(3) The Φ40 mm sized fiber optic image inverter has an excellent performance of fixed-pattern noise, and shows no obvious multi-multi fiber boundary under the observation of 10-fold microscope.

(4) The Φ40 mm sized fiber optic image inverter has a transmittance of more than 70% within a wavelength range of 400-700 nm.

(5) The light-absorbing glass in the present invention is applied to the Φ40 mm sized fiber optic image inverter, by which the absorption of the stray light among optical fibers can be effectively improved to reduce the optical crosstalk among the fibers, thereby achieving the effects of improving the contrast and clarity of imaging in the fiber optic image inverters.

The Φ40 mm sized fiber optic image inverter provided in the present invention has the advantages of low crosstalk of stray light, high resolution and high contrast. By means of the process design, the composition formulation of light-absorbing materials and the fiber-inserting arrangement for the Φ40 mm sized fiber optic image inverter, the technical problem of low contrast in the Φ40 mm sized fiber optic image inverter is solved. The technology of using the light-absorbing glass to improve the contrast of fiber optic image inverters can be applied to low-level-light image intensifiers. This will greatly improve the critical performances such as imaging quality of the fiber optic image inverters, so that the Φ40 mm sized fiber optic image inverter products can meet the supporting requirements in the low-level-light vision industry. This will also replace the conventional fiber optic image inverter products to improve the comprehensive using performances and to promote the development of photoelectric devices in spatial vision measurement, detection imaging and other related fields in the directions of high performance and large visual field, showing a desirable prospect of application and promotion.

In these figures, 1 represents light-absorbing glass, 2 represents core glass and 3 represents cladding glass.

DETAILED DESCRIPTION OF THE INVENTION

In order to make the purposes, technical solutions and advantages of the present invention clearer, the present invention will be further described in detail below in conjunction with accompanying drawings and specific embodiments, which are however not intended to limit the present invention.

Figure 1:
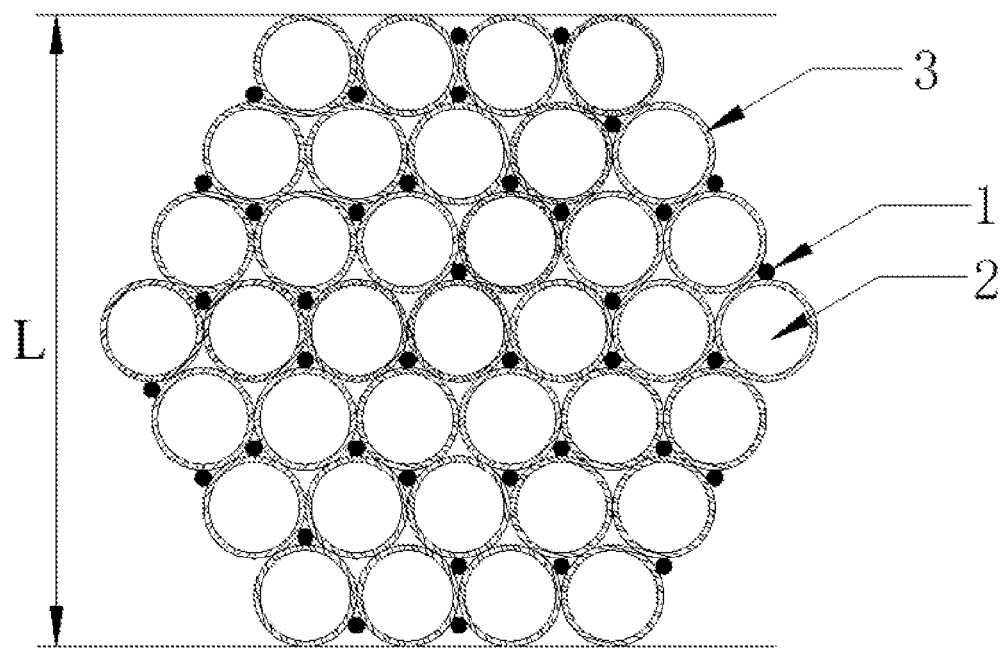
FIG. 1 is a schematic diagram of the internal structure of the optical fiber forming the (Φ40 mm sized fiber optic image inverter provided in an embodiment of the present invention.
Figure 2:
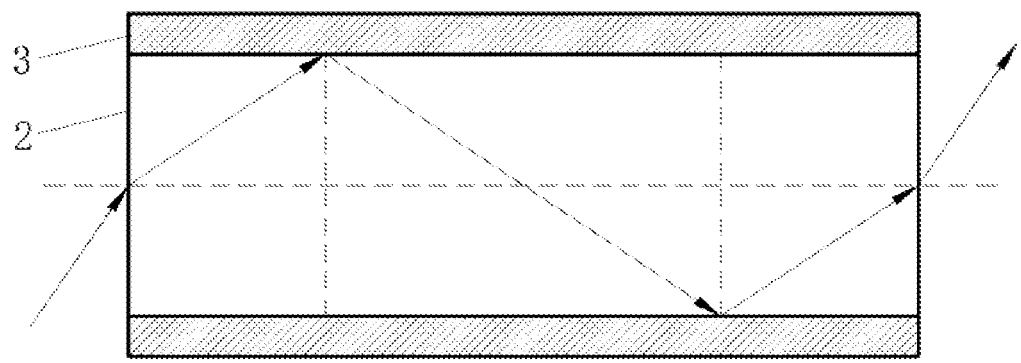
FIG. 2 is a schematic diagram of the structure of the optical fiber provided in an embodiment of the present invention.

Referring to FIG. 1 and FIG. 2, a cladding glass tube and a core glass rod are matched and then drawn into a mono fiber. The mono fiber includes an outer cladding glass 3 and an inner core glass 2. The mono fibers are closely arranged into a hexahedron with a cross section of an orthohexagonal. Light-absorbing glass fibers drawn from light-absorbing glass 1 are disposed among the adjacent mono fibers. After the light-absorbing glass fibers are inserted into the hexahedron, a multi fiber assembly is assembled, which is subsequently drawn into a multi fiber as shown in FIG. 1. The method of extra-mural absorption fibers by using the light-absorbing glass in the present invention can effectively absorb the optical crosstalk inside optical fibers. In FIG. 1, in the multi fiber that has a cross section of an orthohexagonal, a distance L between opposite sides of the hexagonal is 0.78-0.98 mm.

The parameters of the glasses in the present invention to be measured and the measurement methods and instruments are as follows:

(1) refractive index $n_D$ [refractive index of glass at λ=589.3 nm];

(2) mean thermal expansion coefficient $\alpha_{30/300}[10^{-7}/°C.]$ at 30-300° C.;
(3) crystallization temperature of glass Tc (° C.).

Among them, the refractive index $n_D$ of glass is measured on a refractive index device; the transmittance of glass at 400-700 nm is measured on a transmittance device, and the thickness of glass sheet is 0.3±0.01 mm; the linear expansion coefficient $\alpha_{30/300}[10^{-7}/°C.]$ at 30-300° C. is measured on a horizontal dilatometer and expressed as a mean linear expansion coefficient, and is measured in accordance with the method specified in ISO7991; the anti-crystallization temperature of glass is measured in accordance with "Standard practices for measurement of liquidus temperature of glass by the gradient furnace method" specified in ASTM C829-1981.

In the present invention, all the "molar percentage mol. %" is based on the total molar quantity of the final glass composition. The chemical composition (mol. %) of the core glasses and the light-absorbing glasses in the Examples are listed in detail in Table 1 and Table 2, respectively.

TABLE 1

Chemical composition (mol. %) and glass properties of core glasses in Examples

| Composition | Example 1 | Example 2 | Example 3 | Example 4 | Example 5 |
|---|---|---|---|---|---|
| $SiO_2$ | 23.66 | 20.00 | 25.00 | 20.10 | 21.00 |
| $B_2O_3$ | 26.84 | 23.75 | 19.00 | 19.60 | 27.00 |
| CaO | 1.17 | 0.50 | 2.50 | 5.00 | 0.80 |
| SrO | 3.43 | 2.53 | 1.00 | 1.20 | 5.00 |
| BaO | 16.22 | 19.63 | 25.00 | 15.00 | 20.10 |
| $TiO_2$ | 10.06 | 12.69 | 10.00 | 15.00 | 11.00 |
| $La_2O_3$ | 7.67 | 8.16 | 5.00 | 15.00 | 7.00 |
| $Gd_2O_3$ | 7.73 | 7.74 | 10.00 | 8.10 | 7.10 |
| $Nb_2O_5$ | 3.22 | 5.00 | 2.50 | 1.00 | 1.00 |
| $\alpha_{30/300}[10^{-7}/°C.]$ | 85 | 91 | 93 | 89 | 87 |
| $n_D$ | 1.81 | 1.81 | 1.80 | 1.82 | 1.79 |

TABLE 2

Chemical composition (mol. %) and glass properties of light-absorbing glasses in Examples

| Composition | Example 1 | Example 2 | Example 3 | Example 4 | Example 5 | Example 6 |
|---|---|---|---|---|---|---|
| $SiO_2$ | 60.7 | 65.0 | 60.0 | 69.9 | 64.14 | 64.7 |
| $Al_2O_3$ | 5.07 | 1.0 | 10.0 | 3.0 | 3.1 | 3.67 |
| $B_2O_3$ | 11.3 | 15.0 | 12.0 | 10.1 | 13.53 | 10.2 |
| $Na_2O$ | 8.0 | 5.5 | 3.73 | 3.0 | 5.87 | 1.0 |
| $K_2O$ | 3.0 | 3.31 | 4.63 | 7.9 | 3.33 | 10.0 |
| MgO | 0.1 | 0.5 | 1.0 | 0.19 | 0.53 | 0.2 |
| CaO | 2.5 | 1.73 | 2.0 | 0.5 | 1.91 | 5.0 |
| ZnO | 0.01 | 0.1 | 0.02 | 0 | 0 | 0.02 |
| $TiO_2$ | 0.02 | 0.01 | 0.02 | 0.1 | 0 | 0.01 |
| $ZrO_2$ | 1.0 | 0.5 | 0.3 | 0.1 | 0.26 | 0.2 |
| $Fe_2O_3$ | 6.5 | 5.72 | 5.0 | 4.1 | 6.03 | 3.0 |
| $Co_2O_3$ | 0.2 | 0.33 | 0.1 | 0.5 | 0.3 | 0.2 |
| $V_2O_5$ | 0.6 | 0.8 | 1.0 | 0.51 | 0.78 | 1.5 |
| $MoO_3$ | 1.0 | 0.5 | 0.2 | 0.1 | 0.22 | 0.3 |
| Transmittance | 0 | 0 | 0 | 0 | 0 | 0 |
| Thermal expansion coefficient | 80 | 81 | 84 | 84 | 83 | 82 |

The raw materials used in the Examples and the requirements for the raw materials are as follows:

Quartz sand or crystal powder (high pure, oversize at 150 µm sieve is no more than 1%, undersize at 45 µm sieve is no more than 30%, $Fe_2O_3$ content is less than 1 ppm), aluminum oxide powder (analytical pure, average particle size of 50 µm), boric acid or boric anhydride (oversize at 400 µm sieve is no more than 10%, undersize at 63 µm sieve is no more than 10%), sodium carbonate (industrial soda ash), potassium carbonate (analytical pure, purity≥99.0%), basic magnesium carbonate (chemical pure, average particle size of 50 µm), calcium carbonate (analytical pure, average particle size of 250 µm), zinc oxide (analytical pure), titanium dioxide (analytical pure), zirconium oxide (analytical pure), ferric oxide (analytical pure), cobalt trioxide (analytical pure), vanadium pentoxide (analytical pure), molybdenum oxide (analytical pure), strontium carbonate (analytical pure, purity≥99.0%), barium nitrate (analytical pure, purity≥99.0%), lanthanum oxide (5N), gadolinium oxide (5N), niobium oxide (5N).

Example 1

Fabrication of Core Glass Rod:

Firstly, raw materials were selected according to the glass composition of Example 1 in Table 1. The oxides of the elements with variable valences (for example, $Fe_2O_3$) in the raw materials of glass is required to be strictly controlled, so that the $Fe_2O_3$ content in the finished glass is lower than 150 ppm. The raw materials were formulated to meet the chemical composition of the glass in Table 1. Then a platinum crucible was used to melt the raw materials at 1550° C. for 6 hours. In the glass melting process, stirring was carried out for 2 to 3 times to make the glass molten evenly. After melting, the molten glass was cooled to 1420° C. for fining for 2 hours. Subsequently, the molten glass was cast into a specified test product. Thereafter, annealing was carried out by preserving heat for 2 hours at 605° C. and then cooling to 100° C. within 24 hours, followed by furnace cooling to room temperature. The tested properties are shown in Table 1: (1) the refractive index is 1.81; (2) the mean linear expansion coefficient at 30-300° C. is $85\times10^{-7}/°$ C.

Fabrication of Light-Absorbing Glass:

Firstly, raw materials were selected according to the glass composition of Example 1 in Table 2 and formulated to meet the chemical composition of the glass in Table 2. Then a quartz crucible was used to melt the raw materials at 1500° C. for 4 hours. In the glass melting process, stirring was carried out for 1 to 2 times to make the glass molten evenly. After melting, the molten glass was subjected to fining at 1350° C. for 2 hours. Subsequently, the molten glass was cast into specified specifications. After the molten glass was cast and before totally solidified, a vibrator was used to vibrate the molten glass evenly to remove internal holes and bubbles in the molten glass. After cooling and solidifying, the annealing process was conducted by preserving heat for 2 hours at 530° C. and cooling to room temperature within 24 hours. The light-absorbing glass in the present invention was obtained. The basic properties of the sample are shown in Table 2, wherein the visible light transmittance of the sample with a thickness of 0.3 mm is 0%, and the thermal expansion coefficient is $80 \times 10^{-7}/°$ C.

The process of preparing the Φ40 mm sized fiber optic image inverter by using the light-absorbing glass described above included the following steps:
(1) mono fiber and light-absorbing glass fiber preparing: the core glass rod with a high refractive index and a cladding glass tube with a low refractive index were matched, followed by drawing to obtain a mono fibers, wherein each of the mono fibers had a diameter of 3.70 mm; the light-absorbing glass was drawn into a light-absorbing glass fibers, wherein each of the light-absorbing glass fibers had a diameter of 0.56 mm;
(2) multi fiber assemblies drawing: the mono fibers were arranged to form a mono fiber hexagonal prism with a hexagonal cross section and the light-absorbing glass fibers were inserted into gaps among the mono fibers drawn to obtain a multi fiber assemblies, wherein in the mono fiber hexagonal prism, there were 4 mono fibers at each side of the hexagonal cross section of the mono fiber hexagonal prism with the total number of the mono fibers to be 37, and the number of the light-absorbing glass fibers inserted was 42; then the multi fiber assemblies were drawn into a multi fibers, wherein each of the multi fibers had a hexagonal cross section corresponding to that of the multi fiber assembly, and a distance between opposite sides of the hexagonal cross section of the multi fiber was 0.88 mm;
(3) multi-multi assemblies drawing: the multi fibers were arranged to form a multi fiber hexagonal prism with a hexagonal cross section to obtain a multi-multi assemblies, wherein in the multi-multi assemblies arranged by the multi fibers, there were 17 multi fibers at each side of the hexagonal cross section of the multi fiber hexagonal prism with the total number of the multi fibers to be 817; then the multi-multi assemblies were was drawn into a multi-multi fibers, wherein each of the multi-multi fibers had a hexagonal cross section corresponding to that of the multi-multi assembly, and a distance between opposite sides of the hexagonal cross section of the multi-multi fiber was 0.87 mm;
(4) heat press fusing and twisting: the multi-multi fibers were cut into a fixed length and arranged into a fiber assembly bundle; subsequently, the fiber assembly bundle was subjected to heat press fusion according to a compression ratio designed for heat press fusion of the fiber assembly bundle to obtain a Φ40 mm sized fiber optic faceplate block with a fiber pitch of 3.99 μm; then both ends of the fiber optic faceplate block were subjected to a twisting operation at an angle of 180° to obtain the $40 mm sized fiber optic image inverter with an useful area of more than 40 mm.

Figure 3:
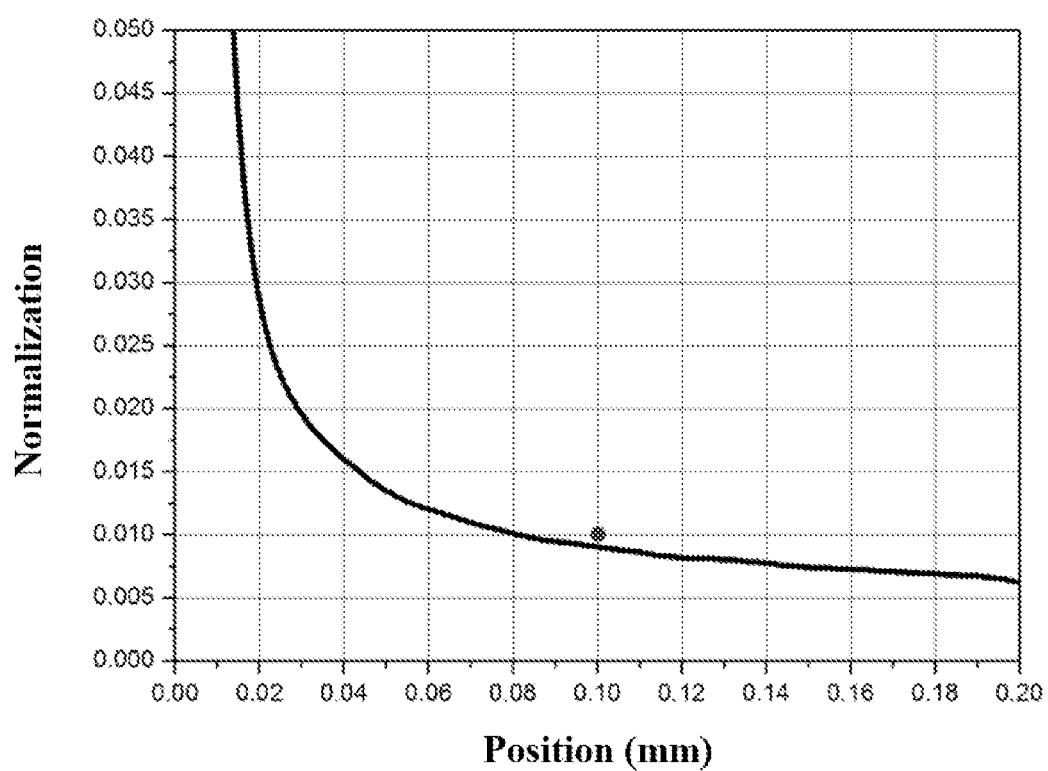
FIG. 3 is a diagram of contrast test on the Φ40 mm sized optic image inverter prepared in Example 1 of the present invention.

Referring to FIG. 3, the contrast performance test on the Φ40 mm sized fiber optic image inverter prepared by using the light-absorbing glass described above shows that the Φ40 mm sized fiber optic image inverter prepared has an optical crosstalk of 0.90% at 0.1 mm from the cutting edge, that is, to have a contrast of less than 1.0% at 0.1 mm from the cutting edge. Moreover, the Φ40 mm sized fiber optic image inverter shows no obvious multi-multi fiber boundary under the observation of 10-fold microscope. The Φ40 mm sized fiber optic image inverter has a transmittance of 72% within a wavelength range of 400-700 nm.

Example 2

Fabrication of Core Glass Rod:
The actual composition of the glass referred to Example 2 in Table 1. The same raw materials and raw material requirements as those in Example 1 in Table 1 were used. Then the raw materials were molten at 1500° C. for 8 hours. In the glass melting process, stirring was carried out for 2 times to make the glass molten evenly. After melting, the molten glass was cooled to 1400° C. for fining for 1.5 hours. Subsequently, the molten glass was cast into a specified test product. Thereafter, annealing was carried out by preserving heat for 1.5 hours at 600° C. and then cooling to 100° C. within 23 hours, followed by furnace cooling to room temperature.

The same test conditions as Example 1 were used. The basic properties of the sample are shown in Table 1: (1) the refractive index is 1.81; (2) the mean linear expansion coefficient at 30-300° C. is $91 \times 10^{-7}/°$ C.

Fabrication of Light-Absorbing Glass:
The actual composition of the glass referred to Example 2 in Table 2. The same raw materials and raw material requirements as those in Example 1 were used. Then a quartz crucible was used to melt the raw materials at 1450° C. for 5 hours. In the glass melting process, stirring was carried out for 1 to 2 times to make the glass molten evenly. After melting, the molten glass was subjected to fining at 1400° C. for 1 hour. Subsequently, the molten glass was cast into specified specifications, vibrated evenly and then annealed. The annealing process was conducted by preserving heat for 2.5 hours at 525° C. and cooling to room temperature within 20 hours. The light-absorbing glass in the present invention was obtained. The basic properties of the sample are shown in Table 2, wherein the visible light transmittance of the sample with a thickness of 0.3 mm is 0%, and the thermal expansion coefficient is $81 \times 10^{-7}/°$ C.

The process of preparing the Φ40 mm sized fiber optic image inverter was substantially the same as Example 1, except that:
(1) mono fiber and light-absorbing glass fiber preparing: each of the mono fibers had a diameter of 3.20 mm; each of the light-absorbing glass fibers had a diameter of 0.49 mm;
(2) multi fiber assemblies drawing: the number of the light-absorbing glass fibers inserted was 60; then drawing the multi fiber assemblies into a multi fiber, and a distance between opposite sides of the hexagonal cross section of multi fiber was 0.78 mm;
(3) multi-multi assemblies drawing: a distance between opposite sides of the hexagonal cross section of in the multi-multi fiber was 0.87 mm;
(4) heat press fusing and twisting: the multi-multi fibers were cut into a fixed length and arranged into a fiber assembly bundle; subsequently, the fiber assembly bundle was subjected to heat press fusion according to a compression ratio designed for heat press fusion of the fiber assembly bundle to obtain a Φ40 mm sized fiber optic faceplate block with a fiber pitch of 3.94 μm;

then both ends of the fiber optic faceplate block were subjected to twisting operation at an angle of 180° to obtain the $40 mm sized fiber optic image inverter with an useful area of more than 40 mm.

The Φ40 mm sized fiber optic image inverter prepared has an optical crosstalk of 0.86% at 0.1 mm from the cutting edge. Moreover, the Φ40 mm sized fiber optic image inverter shows no obvious multi-multi fiber boundary under the observation of 10-fold microscope. The Φ40 mm sized fiber optic image inverter has a transmittance of 71% within a wavelength range of 400-700 nm.

Example 3

Fabrication of Core Glass Rod:

The actual composition of the glass referred to Example 3 in Table 1. The same raw materials and raw material requirements as those in Example 1 in Table 1 were used. Then the raw materials were molten at 1480° C. for 10 hours. In the glass melting process, stirring was carried out for 3 times to make the glass molten evenly. After melting, the molten glass was cooled to 1380° C. for fining for 2.5 hours. Subsequently, the molten glass was cast into a specified test product. Thereafter, annealing was carried out by preserving heat for 2.5 hours at 595° C. and then cooling to 100° C. within 20 hours, followed by furnace cooling to room temperature.

The same test conditions as Example 1 were used. The basic properties of the sample are shown in Table 1: (1) the refractive index is 1.80; (2) the mean linear expansion coefficient at 30-300° cis 93×10$^{-7}$/° C.

Fabrication of Light-Absorbing Glass:

The actual composition of the glass referred to Example 3 in Table 2. The same raw materials and raw material requirements as those in Example 1 were used. Then a quartz crucible was used to melt the raw materials at 1550° C. for 3 hours. In the glass melting process, stirring was carried out for 1 to 2 times to make the glass molten evenly. After melting, the molten glass was subjected to fining at 1300° C. for 2 hours. Subsequently, the molten glass was cast into specified specifications and then annealed. The annealing process was conducted by preserving heat for 3 hours at 540° C. and cooling to room temperature within 21 hours. The light-absorbing glass in the present invention was obtained. The basic properties of the sample are shown in Table 2, wherein the visible light transmittance of the sample with a thickness of 0.3 mm is 0%, and the thermal expansion coefficient is 84×10$^{-7}$/° C.

The process of preparing the Φ40 mm sized fiber optic image inverter was substantially the same as Example 1, except that:

(1) mono fiber drawing: each of the mono fibers had a diameter of 4.20 mm; each of the light-absorbing glass fibers had a diameter of 0.64 mm;
(2) multi fiber assemblies drawing: the number of the light-absorbing glass fibers inserted was 24; then the multi fiber assemblies were drawn into a multi fibers, and a distance between opposite sides of the hexagonal cross section of the multi fiber was 0.98 mm;
(3) multi-multi assemblies drawing: a distance between opposite sides of the hexagonal cross section of the multi-multi fiber was 0.89 mm;
(4) heat press fusing and twisting: the multi-multi fibers were cut into a fixed length and arranged into a fiber assembly bundle; subsequently, the fiber assembly bundle was subjected to heat press fusion according to a compression ratio designed for heat press fusion of the fiber assembly bundle to obtain a Φ40 mm sized fiber optic faceplate block with a fiber pitch of 3.98 μm; then both ends of the fiber optic faceplate block were subjected to twisting operation at an angle of 180° to obtain the Φ40 mm sized fiber optic image inverter with an useful area of more than 40 mm.

The Φ40 mm sized fiber optic image inverter prepared has an optical crosstalk of 0.96% at 0.1 mm from the cutting edge. Moreover, the Φ40 mm sized fiber optic image inverter shows no obvious multi-multi fiber boundary under the observation of 10-fold microscope. The Φd40 mm sized fiber optic image inverter has a transmittance of 71% within a wavelength range of 400-700 nm.

Example 4

Fabrication of Core Glass Rod:

The actual composition of the glass referred to Example 4 in Table 1. The same raw materials and raw material requirements as those in Example 1 in Table 1 were used. Then the raw materials were molten at 1450° C. for 5 hours. In the glass melting process, stirring was carried out for 2 to 3 times to make the glass molten evenly. After melting, the molten glass was cooled to 1390° C. for fining for 2 hours. Subsequently, the molten glass was cast into a specified test product. Thereafter, annealing was carried out by preserving heat for 2 hours at 610° C. and then cooling to 100° C. within 24 hours, followed by furnace cooling to room temperature.

The same test conditions as Example 1 were used. The basic properties of the sample are shown in Table 1: (1) the refractive index is 1.82; (2) the mean linear expansion coefficient at 30-300° C. is 89×10$^{-7}$/° C.

Fabrication of Light-Absorbing Glass:

The actual composition of the glass referred to Example 4 in Table 2. The same raw materials and raw material requirements as those in Example 1 were used. Then a quartz crucible was used to melt the raw materials at 1480° C. for 5 hours. In the glass melting process, stirring was carried out for 1 to 2 times to make the glass molten evenly. After melting, the molten glass was subjected to fining at 1380° C. for 1.5 hours. Subsequently, the molten glass was cast into specified specifications and then annealed. The annealing process was conducted by preserving heat for 2.5 hours at 500° C. and cooling to room temperature within 22 hours. The light-absorbing glass in the present invention was obtained. The basic properties of the sample are shown in Table 2, wherein the visible light transmittance of the sample with a thickness of 0.3 mm is 0%, and the thermal expansion coefficient is 84×10$^{-7}$/° C.

The process of preparing the Φ40 mm sized fiber optic image inverter was as same as Example 1. The Φ40 mm sized fiber optic image inverter prepared has an optical crosstalk of 0.89% at 0.1 mm from the cutting edge. Moreover, the Φ40 mm sized fiber optic image inverter shows no obvious multi-multi fiber boundary under the observation of 10-fold microscope. The Φ40 mm sized fiber optic image inverter has a transmittance of 71% within a wavelength range of 400-700 nm.

Example 5

Fabrication of Core Glass Rod:

The actual composition of the glass referred to Example 5 in Table 1. The same raw materials and raw material requirements as those in Example 1 in Table 1 were used, and the same melting process system and test conditions were adopted. The basic properties of the sample are shown in Table 1: (1) the refractive index is 1.79; (2) the mean linear expansion coefficient at 30-300° C. is 87×10⁻⁷/° C.

Fabrication of Light-Absorbing Glass:

The actual composition of the glass referred to Example 5 in Table 2. The same raw materials and raw material requirements as those in Example 1 were used. Then a quartz crucible was used to melt the raw materials at 1460° C. for 4 hours. In the glass melting process, stirring was carried out for 1 to 2 times to make the glass molten evenly. After melting, the molten glass was subjected to fining at 1350° C. for 2 hours. Subsequently, the molten glass was cast into specified specifications and then annealed. The annealing process was conducted by preserving heat for 3 hours at 549° C. and cooling to room temperature within 20 hours. The light-absorbing glass in the present invention was obtained. The basic properties of the sample are shown in Table 2, wherein the visible light transmittance of the sample with a thickness of 0.3 mm is 0%, and the thermal expansion coefficient is 83×10⁷/° C.

The process of preparing the Φ40 mm sized fiber optic image inverter was as same as Example 1. The Φ40 mm sized fiber optic image inverter prepared has an optical crosstalk of 0.91% at 0.1 mm from the cutting edge. Moreover, the Φ40 mm sized fiber optic image inverter shows no obvious multi-multi fiber boundary under the observation of 10-fold microscope. The Φ40 mm sized fiber optic image inverter has a transmittance of 71% within a wavelength range of 400-700 nm.

Example 6

The fabrication process and the properties of the core glass rod were as same as Example 1.

Fabrication of Light-Absorbing Glass:

The actual composition of the glass referred to Example 5 in Table 2. The same raw materials and raw material requirements as those in Example 1 were used. Then a quartz crucible was used to melt the raw materials at 1470° C. for 5 hours. In the glass melting process, stirring was carried out for 1 to 2 times to make the glass molten evenly. After melting, the molten glass was subjected to fining at 1370° C. for 2 hours. Subsequently, the molten glass was cast into specified specifications and then annealed. The annealing process was conducted by preserving heat for 3 hours at 540° C. and cooling to room temperature within 24 hours. The light-absorbing glass in the present invention was obtained. The basic properties of the sample are shown in Table 2, wherein the visible light transmittance of the sample with a thickness of 0.3 mm is 0%, and the thermal expansion coefficient is 82×10⁻⁷/° C.

The process of preparing the Φ40 mm sized fiber optic image inverter was as same as Example 1. The Φ40 mm sized fiber optic image inverter prepared has an optical crosstalk of 0.90% at 0.1 mm from the cutting edge. Moreover, the Φ40 mm sized fiber optic image inverter shows no obvious multi-multi fiber boundary under the observation of 10-fold microscope. The Φ40 mm sized fiber optic image inverter has a transmittance of 71% within a wavelength range of 400-700 nm.

The descriptions above are only preferred embodiments of the present invention, and are not intended to be used to limit the present invention. Any modifications, equivalent replacements, improvements, etc. made within the spirit and principles of the present invention should be included in the protection scope of the present invention.

What is claimed is:

1. A method for preparing a Φ40 mm sized fiber optic image inverter, comprising the following steps:
   (1) mono fibers and light-absorbing glass fibers preparing: matching core glass rods with a high refractive index and cladding glass tubes with a low refractive index, followed by drawing to obtain mono fibers, wherein each of the mono fibers has a diameter of 3.20-4.20 mm; drawing light-absorbing glass into light-absorbing glass fibers, wherein each of the light-absorbing glass fibers has a diameter of 0.49-0.64 mm;
   (2) multi fiber assemblies drawing: arranging the mono fibers to form a mono fiber hexagonal prism with a hexagonal cross section, and inserting the light-absorbing glass fibers into gaps among the mono fibers drawn to obtain multi fiber assemblies, wherein in the mono fiber hexagonal prism, there are 4 mono fibers at each side of the hexagonal cross section of the mono fiber hexagonal prism with the total number of the mono fibers to be 37, and the number of the light-absorbing glass fibers inserted is 24-60; then drawing the multi fiber assemblies into multi fibers, wherein each of the multi fibers has a hexagonal cross section corresponding to that of the multi fiber assembly, and a distance between opposite sides of the hexagonal cross section of the multi fiber is 0.78-0.98 mm;
   (3) multi-multi assemblies drawing: arranging the multi fibers to form a multi fiber hexagonal prism with a hexagonal cross section to obtain multi-multi assemblies, wherein in the multi-multi assemblies arranged by the multi fibers, there are 17 multi fibers at each side of the hexagonal cross section of the multi fiber hexagonal prism with the total number of the multi fibers to be 817; then drawing the multi-multi assemblies into multi-multi fibers, wherein each of the multi-multi fibers has a hexagonal cross section corresponding to that of the multi-multi assembly, and a distance between opposite sides of the hexagonal cross section of the multi-multi fiber is 0.87-0.89 mm; and
   (4) heat press fusing and twisting: cutting the multi-multi fibers into a fixed length and arranging into a fiber assembly bundle, followed by subjecting to heat press fusion according to a designed compression ratio before and after heat press fusion of the fiber assembly bundle to obtain a fiber optic faceplate block of the Φ40 mm sized fiber optic image inverter with a fiber pitch of no more than 4.0 μm; then subjecting both ends of the fiber optic faceplate block to a twisting operation at an angle of 180° to obtain the Φ40 mm sized fiber optic image inverter with an effective area of more than Φ40 mm, wherein the light-absorbing glass consists of the following components in molar percentage:

| | |
|---|---|
| $SiO_2$ | 60.0-69.9% |
| $Al_2O_3$ | 1.0-10.0% |
| $B_2O_3$ | 10.1-15.0% |
| $Na_2O$ | 1.0-8.0% |
| $K_2O$ | 3.0-10.0% |
| MgO | 0.1-1.0% |
| CaO | 0.5-5.0% |
| ZnO | 0-0.1% |
| $TiO_2$ | 0-0.1% |
| $ZrO_2$ | 0.1-1.0% |
| $Fe_2O_3$ | 3.0-6.5% |
| $Co_2O_3$ | 0.1-0.5% |
| $V_2O_5$ | 0.51-1.5% |
| $MoO_3$ | 0.1-1.0%. | the fiber optic image inverter has an optical crosstalk of less than 1.0% at 0.1 mm from a cutting edge; the fiber optic image inverter has a resolution of more than 140 lp/mm; the fiber optic image inverter has a light spectrum transmittance of more than 70% within a wavelength range of 400-700 nm.

2. The method according to claim 1, wherein a method for preparing the light-absorbing glass comprises the following steps:
   (1) raw material formulating: weighing quartz sand, aluminum oxide, boric acid or boric anhydride, sodium carbonate, potassium carbonate, basic magnesium carbonate, calcium carbonate, zinc oxide, titanium dioxide, zirconium oxide, ferric oxide, cobalt trioxide, vanadium pentoxide and molybdenum oxide in proportion and mixing evenly to obtain a raw material mixture; and
   (2) glass melting: putting the raw material mixture in a crucible for melting, fining after the raw material mixture is molten, casting the obtained molten glass after melting and fining into a specified specification in a mold, and annealing after the glass is cooled and solidified to obtain the light-absorbing glass.

3. The method according to claim 2, wherein the melting comprises melting at a temperature within a range of 1450-1550° C. for 3-5 hours, and stirring the raw material mixture for 1-2 times during the melting process;
   the fining is conducted at a temperature within a range of 1300-1400° C. for 1-2 hours;
   the annealing is conducted by preserving at a temperature within a range of 500-549° C. for 2-3 hours, and then cooling to room temperature within 20-24 hours; and
   the method further includes: after the molten glass is cast and before totally solidified, using a vibrator to vibrate the molten glass evenly to remove internal holes and bubbles in the molten glass.

4. The method according to claim 1, wherein a method for preparing the core glass rod comprises the following steps:
   (1) putting raw materials of quartz sand, boric acid or boric anhydride, calcium carbonate, strontium carbonate, barium nitrate, titanium dioxide, lanthanum oxide, gadolinium oxide and niobium oxide in a platinum crucible according to formulating requirements;
   (2) melting at a first temperature, stirring for 2-3 times during the melting process, and then cooling to a second temperature for fining;
   (3) casting the obtained molten glass after fining into a specified glass product; and
   (4) annealing the glass product molded in an annealing furnace, followed by furnace cooling to room temperature.

5. The method according to claim 4, wherein the first temperature is within a range of 1450-1550° C., the second temperature is within a range of 1380-1420° C., and the melting is conducted for 5-10 hours;
   the fining is conducted for 1.5-2.5 hours;
   the annealing is conducted by preserving at a temperature within a range of 590-610° C. for 1.5-2.5 hours, and then cooling to 100° C. within 20-24 hours.

6. The method according to claim 5, wherein the light-absorbing glass has a light absorption ability and light spectrum absorption effect within a wavelength range of 400-700 nm at a thickness of 0.3±0.01 mm, with a light spectrum transmittance of no more than 0.1%.

7. The method according to claim 5, wherein a core glass used for the core glass rod has the high refractive index of 1.79-1.82, and consists of the following components in molar percentage: $SiO_2$ 20-25%, $B_2O_3$ 19-27%, CaO 0.5-5%, SrO 1-5%, BaO 15-25%, $TiO_2$ 10-15%, $La_2O_3$ 5-15%, $Gd_2O_3$ 7.1-10% and $Nb_2O_5$ 1-5%.

8. The method according to claim 7, wherein the core glass consists of the following components in molar percentage:

| | |
|---|---|
| $SiO_2$ | 20.0-24.0% |
| $B_2O_3$ | 20.0-27.0% |
| CaO | 0.5-2.5% |
| SrO | 2.5-4.0% |
| BaO | 16.0-21.0% |
| $TiO_2$ | 10.0-13.0% |
| $La_2O_3$ | 5.0-8.0% |
| $Gd_2O_3$ | 7.1-8.5% |
| $Nb_2O_5$ | 1.0-3.5%. |

9. The method according to claim 8, wherein the core glass has a mean linear thermal expansion coefficient of $(89\pm4)\times10^{-7}/°$ C. within a range of 30-300° C.

10. The method according to claim 1, wherein the light-absorbing glass consists of the following components in molar percentage:

| | |
|---|---|
| $SiO_2$ | 60.0-65.0% |
| $Al_2O_3$ | 3.0-6.0% |
| $B_2O_3$ | 11.0-15.0% |
| $Na_2O$ | 5.0-8.0% |
| $K_2O$ | 3.0-8.0% |
| MgO | 0.1-1.0% |
| CaO | 1.0-2.5% |
| ZnO | 0-0.1% |
| $TiO_2$ | 0-0.1% |
| $ZrO_2$ | 0.1-1% |
| $Fe_2O_3$ | 5.0-6.5% |
| $Co_2O_3$ | 0.1-0.5% |
| $V_2O_5$ | 0.51-1.0% |
| $MoO_3$ | 0.1-1.0%. |

* * * * *